(12) United States Patent
Oura et al.

(10) Patent No.: US 6,713,217 B2
(45) Date of Patent: *Mar. 30, 2004

(54) NONAQUEOUS ELECTROLYTE SECONDARY BATTERY WITH A POLYOLEFIN MICROPOROUS MEMBRANE SEPARATOR

(75) Inventors: Takafumi Oura, Neyagawa (JP); Masaki Kitagawa, Katano (JP); Hajime Nishino, Neyagawa (JP); Hizuru Koshina, Neyagawa (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 514 days.

(21) Appl. No.: 08/983,281
(22) PCT Filed: May 7, 1997
(86) PCT No.: PCT/JP97/01530
§ 371 (c)(1), (2), (4) Date: Jan. 8, 1998
(87) PCT Pub. No.: WO97/42676
PCT Pub. Date: Nov. 13, 1997

(65) Prior Publication Data
US 2001/0016289 A1 Aug. 23, 2001

(30) Foreign Application Priority Data
May 9, 1996 (JP) ................................................ 8-114538

(51) Int. Cl.$^7$ .......................... H01M 2/16; H01M 10/14
(52) U.S. Cl. ........................................ 429/247; 429/251
(58) Field of Search ............................... 429/190–194, 429/218, 247–251; 428/523

(56) References Cited

U.S. PATENT DOCUMENTS

| | | | | | |
|---|---|---|---|---|---|
| 4,751,147 A | * | 6/1988 | Stephens | ............... | 428/523 |
| 5,028,500 A | * | 7/1991 | Fong | ............... | 429/194 |
| 5,256,503 A | * | 10/1993 | Cook | ............... | 429/249 |
| 5,316,875 A | * | 5/1994 | Murai | ............... | 429/194 |
| 5,336,573 A | * | 8/1994 | Zuckerbrod | ............... | 429/252 |
| 5,667,660 A | * | 9/1997 | Lin | ............... | 205/59 |

FOREIGN PATENT DOCUMENTS

| | | |
|---|---|---|
| EP | 0 603 500 | 6/1994 |
| EP | 0 682 376 | 11/1995 |
| JP | 7-134988 | 5/1995 |
| JP | 07192753 | 7/1995 |
| JP | 7-302595 | 11/1995 |
| JP | 7-307146 | 11/1995 |

* cited by examiner

Primary Examiner—Mark Ruthkosky
(74) Attorney, Agent, or Firm—RatnerPrestia

(57) ABSTRACT

The present invention relates to a nonaqueous electrolyte secondary battery, and more particularly to its separator, and it is an object thereof to prevent electrolyte leakage accident due to elevation of cell internal pressure even if the cell is exposed to high temperature without sacrificing the cell capacity.

To achieve the object, by using the polyolefin group separator large in endothermic calorie per unit area by the heat of fusion in a temperature range of 70 to 150° C., and selecting appropriate graphite powder for negative electrode and organic solvent in nonaqueous electrolyte, the electrolyte leakage accident can be successfully eliminated by suppressing the reaction between the cell active substance and organic solvent, thereby suppressing elevation of cell internal pressure.

12 Claims, 1 Drawing Sheet

NONAQUEOUS ELECTROLYTE SECONDARY BATTERY WITH A POLYOLEFIN MICROPOROUS MEMBRANE SEPARATOR

This application is a U.S. National Phase Application of PCT International Application PCT/JP97/01530.

TECHNICAL FIELD

The present invention relates to a nonaqueous electrolyte secondary battery, and more particularly to its separator.

BACKGROUND ART

Recently, for reduction of size and weight and extension of working time of notebook type personal computer, PDA, mobile telephone, camcorder, and other electronic appliances, development and improvement of secondary battery of high energy density are strongly demanded as built-in power source. As one of battery systems satisfying such demand, a high expectation is aimed at a nonaqueous electrolyte secondary battery of 4 V class using a lithium contained transition metal oxide such as $LiCo_2$, $LiNiO_2$ and $LiMn_2O_4$ as the positive electrode, a carbon material such as graphite as the negative electrode, and an organic electrolyte composed of organic solvent solution of lithium salt as the nonaqueous electrolyte. This battery system is generally known as lithium-ion secondary battery, in which charging causes lithium ions to be deintercalated from the positive electrode, and intercalated to the negative electrode through the electrolyte. Likewise, discharging causes the lithium ions to be deintercalated from the negative electrode, and intercalated to the positive electrode through the electrolyte. Reactions of intercalation and deintercalation of lithium ions by such charging and discharging can be repeated reversibly, and a long cycle life is expected. In the lithium secondary battery using metal lithium in the negative electrode hitherto studied as secondary battery of high voltage and high energy density, metal lithium precipitates on the negative electrode and the lithium concentration in the electrolyte drops by charging, but from the terminal stage of charging to the overcharged region, dendrite metal lithium crystals precipitate and penetrate through the separator to cause internal short-circuit, and as a result not only the battery is unusable, but also there was a risk of accident of fire or rupture due to sudden increase of cell temperature. In the lithium-ion secondary battery, so far as it is not overcharged, dendrite metal lithium crystals do not precipitate, and the safety and reliability is enhanced very much. In this lithium-ion secondary battery, however, when charged at low temperature, diffusion of lithium ions is insufficient, dendrite metal lithium crystals may precipitate on the negative electrode, and internal short-circuit may be caused.

The separator for lithium secondary battery and lithium-ion secondary battery is made of a microporous thin membrane composed of at least one of polyethylene (PE) and polypropylene (PP) being insoluble in organic solvent such as ether and ester in organic electrolyte which is a nonaqueous electrolyte, sufficient in permeation of electrolyte, and easy in diffusion of lithium ions. More specifically, multilayer hybrid membranes of PE membrane and PP membrane or double layers or more of PE and PP with porosity of 40 to 70% in a thickness of 20 to 50 $\mu$m have been used.

On the other hand, as means for meeting the demand of high energy density by high capacity of battery, it is important to fill the cell of specified overall dimensions with as many positive and negative active substances as possible. It is hence attempted to form separator interposed between the negative and positive electrodes as thinly as possible. This attempt is a contradictory means to the necessity of using a relatively thick separator from the viewpoint of preventing-internal short-circuit mentioned above.

It is hence an object of the invention a nonaqueous electrolyte secondary battery, using a relatively thin separator than in the prior art made of a microporous polyolefin group membrane of PE of a greater heat of fusion or multilayer of PE and PP, enhanced in reliability, without sacrificing the cell capacity, by effectively absorbing heat generation by reaction between the battery active substance and organic solvent in the electrolyte occurring at high temperature, in spite of a relatively thin separator, thereby suppressing the cell temperature rise, suppressing elevation of cell internal pressure, preventing electrolyte leak, and enhancing the resistance to electrolyte leak at high temperature.

DISCLOSURE OF THE INVENTION

The present invention relates to a nonaqueous electrolyte secondary battery, especially lithium-ion secondary battery, using a polyolefin group of endothermic calorie per unit area by the heat of fusion of at least 0.07 cal/cm$^2$ and thickness of 15 to 30 $\mu$m, preferably made of PE or multilayer of PE and PP, as hybrid separator. By using such separator, without sacrificing the cell capacity, internal short-circuit and temperature rise due to reaction heat between the battery active substance and organic solvent in the electrolyte at high temperature can be suppressed, gas generation is suppressed, and electrolyte leak due to elevation of cell internal pressure is eliminated, so that a high reliability is assured.

BEST MODE FOR CARRYING OUT THE INVENTION

Figure 1:
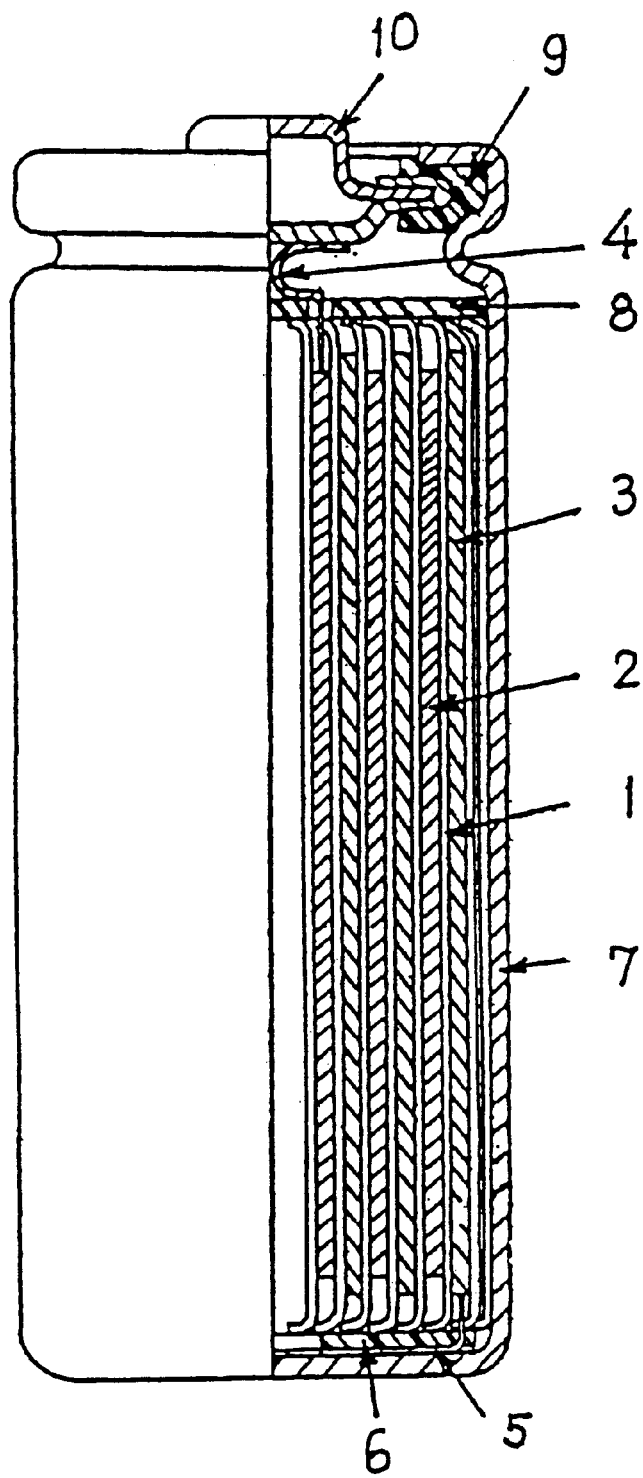
FIG. 1 is a longitudinal sectional view of a cylindrical nonaqueous electrolyte secondary battery of spiral electrode group construction according to an embodiment of the invention.

An embodiment of the invention is described specifically below by referring to the drawing and tables.

Embodiment

FIG. 1 is a longitudinal sectional view of a cylindrical lithium-ion secondary battery (diameter 17 mm, overall height 50 mm), showing an embodiment of a nonaqueous electrolyte secondary battery according to the invention.

In FIG. 1, an electrode group is composed by winding a band-shaped positive electrode 2 and a negative electrode spirally plural times through a separator 1. An aluminum-made positive electrode lead piece 4 and a nickel-made negative electrode lead piece 5 are respectively welded to the positive electrode 2 and negative electrode 3. The separator 1 projecting to the upper and lower surfaces of the electrode group is heated and shrunk, and a PE-made bottom insulator plate 6 is mounted, and put in a cell container 7 of nickel plated steel plate structure, and the other end of the negative electrode lead piece 5 is spot-welded to the inner bottom of the cell container 7. A PE-made upper insulator plate 8 is mounted on the upper surface of the electrode group, a groove is formed in a specified position at the opening of the cell container 7, and a specified amount of an organic electrolyte, which is a nonaqueous electrolyte, is poured in and impregnated. After spot-welding the other end of the positive electrode lead piece 4 to the lower surface of a sealing plate 10 made of stainless steel to which a PP-made gasket 9 is fitted on the peripheral edge, the sealing plate 10 is fitted into the opening of the cell container 7 through the gasket 9, and the upper edge of the cell container 7 is curled inward to seal tightly, thereby completing the cell.

EXAMPLE 1

The positive electrode was fabricated as follows. First, lithium carbonate, $Li_2CO_3$, and cobalto-cobaltic oxide, $Co_3O_4$, are mixed, and baked and synthesized in air for 10 hr at 900° C., and lithium contained cobalt oxide, $LiCoO_2$, is obtained. By mixing 100 parts by weight of $LiCoO_2$, 3 parts by weight of acetylene black and conductive agent, and 7 parts by weight of polytetrafluoroethylene as binder, the mixture is added in 100 parts by weight of 1 wt. % carboxymethyl cellulose aqueous solution (CMC), and stirred and mixed, and paste for positive electrode is obtained.

Both sides of an aluminum, Al, foil of 30 μm in thickness as an electric collector are coated with the paste for positive electrode, dried and pressed by roll, and a positive electrode is obtained by cutting into specified dimensions.

The negative electrode was fabricated as follows. First, meso-carbon microbeads (MCMB) are graphitized at 2,800° C., and pulverized to a mean particle size of about 3 μm, and a screened graphite powder is obtained. The plane interval ($d_{002}$) of (002) plane of this graphite powder measured by X-ray diffraction was 3.360. and the specific surface area by BET method was 4.0 $m^2/g$.

Mixing 100 parts by weight of this graphite powder and 5 parts by weight of styrene-butadiene rubber, the mixture is added in 100 parts by weight of 1 wt. % CMC aqueous solution, and stirred and mixed, and paste for negative electrode is obtained.

Both sides of a copper, Cu, foil of 20 μm in thickness as an electric collector are coated with the paste for negative electrode, dried and pressed by roll, and a negative electrode is obtained by cutting into specified dimensions.

Using the separators having a uniform thickness of 25 μm although different in the endothermic calorie per unit area because the heat of fusion varies in a temperature range of 70 to 150° C. as shown in Table 1, electrode groups were composed, and cells A to G were fabricated. The endothermic calorie of the separator was measured by a differential thermal analysis equipment.

The nonaqueous electrolyte was an organic electrolyte prepared by dissolving lithium hexafluorophosphate, $LiPF_6$, at a concentration of 1.5 mol/liter in a mixed solvent of ethylene carbonate (EC) and ethyl methyl carbonate (EMC) at a ratio by volume of 1:3.

Preparing five cells of each kind, and setting at a constant voltage of 4.2 V at 20° C., the cells were charged at constant current and constant voltage for 2 hr at constant current of 630 mA, and discharged to an end voltage of 3.0 V at constant current of 720 mA. After repeating 20 cycles of charging and discharging, all cells were fully charged, and presented for heating test, and the cell temperature and incidence rate of electrolyte leakage were investigated.

In the heating test, each cell was heated from room temperature to 150° C. at a rate of 5° C. per minute, and held at 150° C. for 10 min, and in this state the cell temperature and electrolyte leakage rate were investigated. The results are summarized in Table 1.

TABLE 1

| Cell | Endothermic calorie ($cal/cm^2$) | Cell internal temperature (° C.) | Leakage rate |
|---|---|---|---|
| A | 0.03 | 198 | 5/5 |
| B | 0.04 | 185 | 5/5 |
| C | 0.05 | 172 | 3/5 |
| D | 0.06 | 160 | 1/5 |
| E | 0.07 | 148 | 0/5 |
| F | 0.08 | 138 | 0/5 |
| G | 0.09 | 130 | 0/5 |

It is clear from the results in Table 1 that the temperature rise in the cell and leakage of electrolyte can be suppressed by using the separators having the larger endothermic calorie of at least 0.07 $cal/cm^2$.

In the conventional lithium-ion secondary battery, by raising the cell temperature, it is known that heat is generated by reaction between the cell active substance and organic solvent in the nonaqueous electrolyte. As a result, due to evaporation or decomposition of organic solvent, the cell internal pressure climbed up, or the explosion-proof safety mechanism of the cell was actuated to cause electrolyte leak accident.

However, by using the separator having a large endothermic calorie, such temperature rise due to reaction heat can be effectively absorbed, and gas generation by this reaction is suppressed, so that the cell internal pressure is hardly elevated. It is hence judged that such electrolyte leakage accident may be prevented.

In this example, the thickness of the separator was fixed at 25 μm. In the PE membrane of same heat of fusion, as the thickness increases, the endothermic calorie per unit area becomes larger. However, the internal resistance of the cell elevates, the active substance filling amount of the positive and negative electrodes is sacrificed, and the cell capacity is lowered. It is hence not beneficial to increase the separator thickness too much.

On the other hand, if the separator thickness is reduced to about 10 μm, it is easily torn, and it involves the problem of separator strength. That is, the risk of internal short-circuit increases. Or even in the material of a large heat of fusion, if the thickness is extremely small, the effect of suppressing heat generation in the cell by heat absorbing phenomenon of the invention is hardly expected.

Although omitted herein, as a result of investigation by using the PE with various heats of fusion and by varying the thickness, an appropriate thickness of PE separator is found to be in a range of 15 to 30 μm.

In this example, the separator is composed of a single PE membrane, but similar effects were obtained in the laminate hybrid membrane separator composed of a microporous PP membrane and a PE membrane of about 15 μm in thickness, having the endothermic calorie per unit area by heat of fusion of at least 0.07 $cal/cm^2$ in a temperature range of 70 to 150° C.

EXAMPLE 2

The positive active substance in this example was lithium contained nickel oxide $LiNiO_2$, instead of $LiCoO_2$ in example 1. That is, lithium hydroxide, $LiOH·H_2O$, and nickel hydroxide, $Ni(OH)_2$, are mixed and baked in the air for 10 hr at 750° C., and $LiNiO_2$ is obtained. To a mixture of 100 parts by weight of this $LiNiO_2$, 3 parts by weight of acetylene black as conductive agent, and 4 parts by weight of polyvinylidenefluoride as binder, 100 parts by weight of N-methyl pyrrolidone is poured and stirred, and paste for positive electrode is obtained.

Thereafter, by the same procedure of coating, drying, pressing and cutting as in example 1, the positive electrode is obtained.

The negative electrode was fabricated same as in example 1. However, the graphite powder for the negative electrode was modified. That is, a total of ten types of graphite powder were used, consisting of the graphite powder varied in the temperature for graphitizing MCMB at 3000, 2800, 2500, 2300 and 2100° C. (the mean particle size adjusted to about 3 μm by pulverizing and screening), and flake graphite, being natural graphite of high degree of crystallization, with the mean particle size of about 50, 30, 20, 10 and 5 μm. All prepared cells are large in the positive electrode capacity so that the discharge capacity may be defined by the negative electrode capacity, and the graphite powder for negative electrode was evaluated.

The separator of all cells was a PE membrane with endothermic calorie per unit area by the heat of fusion of 0.07 cal/cm$^2$ in a temperature range of 70 to 150° C., and the nonaqueous electrolyte was the same organic electrolyte as in example 1, and cells H to Q were fabricated. After 20 cycles of charging and discharging in the same condition as in example 1, five cells of each category were presented for heating test, and the cell internal temperature and electrolyte leak were investigated. The results are summarized in Table 2.

In the flake graphite powder of extremely high degree of crystallization, as the specific surface area is increased by pulverizing, the initial specific capacity is increased. However, the cell internal temperature in heating test tends to be higher, and in cells P and Q, the cell internal temperature exceeded 160° C., and electrolyte leak was noted. It means, even if the separator of large endothermic calorie as in the invention is used, electrolyte may leak when the heat generation by the reaction between the cell active substance and organic solvent is great. In the flake graphite powder, therefore, the specific surface area is judged to be appropriate at 2.0 m$^2$/g or more from the initial specific capacity, and less than 8.0 m$^2$/g from the electrolyte leakage rate. In other words, in the flake graphite powder, the mean particle size is preferred to be in a range of 30 μm or less and over 10 μm.

By using the flake graphite powder of such mean particle size and specific surface area in the negative electrode, the capacity is high, and moreover if the cell is heated to high temperature, reaction between the cell active substance and organic so lvent in the nonaqueous electrolyte is suppressed, and hence gas generation is estimated to be arrested.

EXAMPLE 3

The positive active substance in this example was lithium contained manganese oxide, LiMn$_2$O$_4$, instead of LiCoO$_2$ in example 1 or LiNiO$_2$ in example 2. That is, Li$_2$CO$_3$ and manganese dioxide, MnO$_2$, are mixed, and baked in the air for 30 hr at 800° C., and Li$_2$Mn$_2$O$_4$ is obtained. Using LiMn$_2$O$_4$, instead of LiCoO$_2$ in example 1, the positive electrode is obtained in the same condition as in example 1.

TABLE 2

| | | Graphite powder for negative electrode | | | | | Heating test | |
|---|---|---|---|---|---|---|---|---|
| Cell | Kind | Graphitizing temperature (° C.) | Mean particle size (μm) | $d_{002}$ (Å) | BET specific surf. area (m$^2$/g) | Initial specific capacity (mAh/g) | Cell internal temp. (° C.) | Leakage rate |
| H | Artificial | 3000 | Approx. 3 | 3.355 | 4.0 | 830 | 156 | 0/5 |
| I | Artificial | 2800 | Approx. 3 | 3.360 | 4.0 | 800 | 151 | 0/5 |
| J | Artificial | 2500 | Approx. 3 | 3.370 | 4.0 | 770 | 147 | 0/5 |
| K | Artificial | 2300 | Approx. 3 | 3.380 | 4.0 | 690 | 142 | 0/5 |
| L | Artificial | 2100 | Approx. 3 | 3.390 | 4.0 | 590 | 138 | 0/5 |
| M | Flake | — | Approx. 50 | 3.360 | 0.5 | 830 | 140 | 0/5 |
| N | Flake | — | Approx. 30 | 3.360 | 2.0 | 900 | 146 | 0/5 |
| O | Flake | — | Approx. 20 | 3.360 | 6.0 | 930 | 157 | 0/5 |
| P | Flake | — | Approx. 10 | 3.360 | 8.0 | 935 | 169 | 2/5 |
| Q | Flake | — | Approx. 5 | 3.360 | 10.0 | 938 | 187 | 5/5 |

As clear from Table 2, in cells H to O, excluding cells P and Q, the cell internal temperature in heating test was less than 160° C. and the leakage was 0/5, and same as in example 1, hence, it is known that the PE separator of 25 μm in thickness and endothermic calorie of 0.07 cal/cm$^2$ is effective.

In the powder obtained by graphitizing MCMB, the graphitizing temperature was low, and when $d_{002}$ was over 3.38, the initial specific capacity (mAh/g) was extremely lowered. This seems because the interlayer distance of graphite is too wide and the intercalation quantity of lithium is decreased. Besides, as $d_{002}$ becomes smaller, the cell internal temperature in heating test tends to be higher. This is considered because, as the graphitizing temperature becomes higher, the reactivity with the organic solvent in the nonaqueous electrolyte becomes higher and the heat generation increases. Therefore, when graphitizing by heating MCMB, $d_{002}$ is preferred to be 3.350 or more and less than 3.380.

The negative electrode was manufactured same as in example 1, and the separator was PE membrane same as in example 1, and the cell was fabricated by varying the organic solvent in the nonaqueous electrolyte. That is, in eight types of mixed solvents composed of 1 part by volume of EC, with 3 parts by volume of EMC (same as in example 1), 3 parts by volume of diethyl carbonate (DEC), 3 parts by volume of dimethyl carbonate (DMC), 2 parts by volume of DEC and 1 part by volume of propylene carbonate (PC), 2 parts by volume of DEC and 1 part by volume of methyl propionate (MP), 2 parts by volume of DEC and 1 part by volume of ethyl propionate (EP), 3 parts by volume of 1, 2-dimethoxy ethane (DME), and 3 parts by volume of tetrahydrofuran (THF), LiPF$_6$ was dissolved at each concentration of 1.5 mol/liter, and the obtained organic electrolytes were used.

In five cells of each category, the cell internal temperature and electrolyte leakage rate were investigated by heating test same as in examples 1 and 2. The results are summarized in Table 3.

As the solvent of organic electrolyte used as nonaqueous electrolyte, EC is excellent in thermal stability, but is high in melting point (34° C.) and high in viscosity, and therefore when the mixing ratio of EC is heightened, the electrical conductivity of lithium ions is lowered. In this example, the content of EC in the mixed solvent of organic electrolyte was fixed at 25 vol. %.

TABLE 3

| Cell | Solvent composition | Cell internal temperature (° C.) | Leakage rate |
|---|---|---|---|
| R | EC:EMC = 1:3 | 144 | 0/5 |
| S | EC:DEC = 1:3 | 150 | 0/5 |
| T | EC:DMC = 1:3 | 139 | 0/5 |
| U | EC:DEC:PC = 1:2:1 | 140 | 0/5 |
| V | EC:DEC:MP = 1:2:1 | 146 | 0/5 |
| W | EC:DEC:EP = 1:2:1 | 144 | 0/5 |
| X | EC:DME = 1:3 | 150 | 3/5 |
| Y | EC:THF = 4:3 | 164 | 5/5 |

As known from the results in Table 3, when cyclic ether such as THF was mixed, the elevation of cell internal temperature was significant. By contrast, by mixing chain ether such as DME, the elevation of cell internal temperature was slightly suppressed, but the cell internal pressure climbed up due to generation of decomposition gas, and electrolyte leakage could not be eliminated. On the other hand, mixture of cyclic and chain carbonates was effective for suppressing the elevation of cell internal temperature. Incidentally, the oxidation potential of cyclic ether such as THF and chain ether such as DME is lower than that of ester such as cyclic and chain carbonate, and therefore decomposition reaction of solvent occurs when charging, and the cell capacity drops.

Therefore, as the solvent of nonaqueous electrolyte, by using at least one organic solvent selected from the group consisting of EC, PC, DMC, DEC, EMC, MP and EP, gas generation by reaction with the cell active substance can be suppressed even in the cell at high temperature, and leakage of electrolyte due to elevation of cell internal pressure can be effectively prevented.

In examples 1, 2 and 3, as the positive active substance, $LiCoO_2$, $LiNiO_2$, and $LiMn_2O_4$ were independently used respectively, but the invention is not limited to these active substances alone. It can be generally applied to lithium contained transition metal oxides expressed in the formula $LixMyO_2$ (where M is at least one transition metal selected from the group consisting of Mn, Fe, Co and Ni, $0.5 \leq x \leq 1.0$, $1.0 \leq y \leq 2.0$).

The negative electrode of the invention is not limited to the carbon material in which lithium ions can repeat intercalation and deintercalation reversibly by charging and discharging. The invention is applicable also to the negative electrode made of transition metal oxide capable of repeating intercalation and deintercalation of lithium ions reversibly same as in the carbon material, or to the negative electrode made of metal lithium or lithium alloy.

Still more, so as not to depart from the scope of the invention, the cell shape is not limited to the cylindrical shape.

What is claimed is:

1. A nonaqueous electrolyte secondary battery comprising:
   a positive electrode comprising a positive active substance;
   a separator comprising a polyolefin group microporous membrane of 15 to 30 μm in thickness, with an endothermic calorie per unit area by the heat of fusion of at least 0.07 cal/cm$^2$ in a temperature range of 70 to 150° C.; and
   a negative electrode comprising a carbon material which is at least one of artificial graphite powder or natural graphite powder, the carbon material having a plane interval (d002) of (002) plane by X-ray diffraction of less than 3.380 A and a specific surface area by BET method of 2.0 m$^2$/g or more and less than 8.0 m$^2$/g;
   wherein said separator absorbs heat generated by said negative electrode.

2. A nonaqueous electrolyte secondary battery comprising:
   a positive electrode comprising a positive active substance;
   a separator comprising a microporous membrane of 15 to 30 μm in thickness, with an endothermic calorie per unit area by the heat of fusion of at least 0.07 cal/cm$^2$ in a temperature range of 70 to 150° C., said separator selected from the group consisting of:
   a polyethylene independent microporous membrane;
   a multilayer hybrid membrane comprising a microporous polyethylene membrane and a microporous polypropylene membrane; and
   a negative electrode comprising a carbon material which is at least one of artificial graphite or natural graphite powder with the plane interval (d002) of (002) plane by X-ray diffraction of less than 3.380 A, and the specific surface area by BET method of 2.0 m$^2$/g or more and less than 8.0 m$^2$/g;
   wherein said separator absorbs heat generated by said negative electrode.

3. A nonaqueous electrolyte secondary battery of claim 1, wherein the positive active substance is a lithium containing transition metal oxide expressed in a formula $Li_xM_yO_2$, where M is at least one transition metal selected from the group consisting of Mn, Fe, Co and Ni; $0.5 \leq x \leq 1.0$; and $1.0 \leq y \leq 2.0$.

4. A nonaqueous electrolyte secondary battery of claim 1, wherein the nonaqueous electrolyte comprises lithium hexafluorophosphate in an organic solvent selected from the group consisting of ethylene carbonate, propylene carbonate, dimethyl carbonate, diethyl carbonate, methyl ethyl carbonate, methyl propionate, and ethyl propionate.

5. A nonaqueous electrolyte secondary battery of claim 2, wherein the positive active substance is a lithium containing transition metal oxide expressed in a formula $Li_xM_yO_2$, where M is at least one transition metal selected from the group consisting of Mn, Fe, Co and Ni; $0.5 \leq x \leq 1.0$; and $1.0 \leq y \leq 2.0$.

6. A nonaqueous electrolyte secondary battery of claim 2, wherein the nonaqueous electrolyte comprises lithium hexafluorophosphate in an organic solvent selected from the group consisting of ethylene carbonate, propylene carbonate, dimethyl carbonate, diethyl carbonate, methyl ethyl carbonate, methyl propionate, and ethyl propionate.

7. A nonaqueous electrolyte secondary battery of claim 3, wherein the nonaqueous electrolyte comprises lithium hexafluorophosphate in an organic solvent selected from the group consisting of ethylene carbonate, propylene carbonate, dimethyl carbonate, diethyl carbonate, methyl ethyl carbonate, methyl propionate, and ethyl propionate.

8. A nonaqueous electrolyte secondary battery of claim 5, wherein the nonaqueous electrolyte comprises lithium hexafluorophosphate in an organic solvent selected from the group consisting of ethylene carbonate, propylene carbonate, dimethyl carbonate, diethyl carbonate, methyl ethyl carbonate, methyl propionate, and ethyl propionate.

9. The nonaqueous electrolyte secondary battery of claim 1, wherein the polyolefin is polyethylene.

10. A nonaqueous electrolyte secondary battery of claim 9, wherein the positive active substance is a lithium containing transition metal oxide expressed in a formula $Li_xM_yO_2$, where M is at least one transition metal selected from the group consisting of Mn, Fe, Co and Ni; $0.5 \leq x \leq 1.0$; and $1.0 \leq y \leq 2.0$.

11. The nonaqueous electrolyte secondary battery of claim 1, wherein the polyolefin is polypropylene.

12. A nonaqueous electrolyte secondary battery of claim 11, wherein the positive active substance is a lithium containing transition metal oxide expressed in a formula $Li_xM_yO_2$, where M is at least one transition metal selected from the group consisting of Mn, Fe, Co and Ni; $0.5 \leq x \leq 1.0$; and $1.0 \leq y \leq 2.0$.

* * * * *